(12) United States Patent
Neumann

(10) Patent No.: US 12,555,669 B2
(45) Date of Patent: Feb. 17, 2026

(54) SYSTEMS AND METHODS FOR GENERATING AN INTEGUMENTARY DYSFUNCTION NOURISHMENT PROGRAM

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

(*) Notice: Subject to any disclaimer, the term of this patent is extended or adjusted under 35 U.S.C. 154(b) by 119 days.

(21) Appl. No.: 17/164,412

(22) Filed: Feb. 1, 2021

(65) Prior Publication Data

US 2022/0246273 A1    Aug. 4, 2022

(51) Int. Cl.
G16H 20/60    (2018.01)
G06N 20/00    (2019.01)

(52) U.S. Cl.
CPC ............. *G16H 20/60* (2018.01); *G06N 20/00* (2019.01)

(58) Field of Classification Search
CPC .............................. G16H 20/60; G06N 20/00
See application file for complete search history.

(56) References Cited

U.S. PATENT DOCUMENTS 10,228,361 B2    3/2019    Astarita
10,426,403 B2    10/2019   Butte
(Continued)

FOREIGN PATENT DOCUMENTS

CA    2783493 A1 *    1/2013    ............. G06F 17/30
WO    2020168015 A1   8/2020

OTHER PUBLICATIONS

Kaiser Permanente, "10 nutrition and diet apps for 2019", Kaiser Foundation Health Plan of Washington, https://web.archive.org/web/20200609100332/https://wa-health.kaiserpermanente.org/best-diet-apps/ (Year: 2020).*

(Continued)

*Primary Examiner* — Van H Oberly
*Assistant Examiner* — Brooks T Hale
(74) *Attorney, Agent, or Firm* — Caldwell Intellectual Property Law

(57) ABSTRACT

A system for generating an integumentary dysfunction nourishment program includes a computing device, the computing device configured to obtain an integumentary bundle element, identify a physiological group as a function of the integumentary bundle element, produce an integumentary profile as a function of the physiological group, wherein producing further comprises ascertaining an integumentary functional divergence as a function of the physiological group and an integumentary recommendation, and identifying the integumentary profile as a function of the integumentary functional divergence using an integumentary machine-learning model, determine an edible as a function of the integumentary profile, wherein determining further comprises receiving a nourishment composition from an edible directory, producing a nourishment demand as a function of the integumentary profile, and determining the edible as a function of the nourishment composition and nourishment demand using an edible machine-learning model, and generate a nourishment program as a function of the edible.

18 Claims, 7 Drawing Sheets

(56) References Cited

U.S. PATENT DOCUMENTS

| | | | |
|---|---|---|---|
| 10,679,725 B2 | 6/2020 | Hosseini | |
| 10,878,567 B1* | 12/2020 | Abid | A61B 5/7267 |
| 2007/0016102 A1* | 1/2007 | Askin | A61B 5/150206 |
| | | | 600/573 |
| 2007/0288249 A1 | 12/2007 | Rowe | |
| 2010/0227340 A1 | 9/2010 | Rozenshteyn | |
| 2015/0230712 A1* | 8/2015 | Aarabi | A61B 5/0077 |
| | | | 600/476 |
| 2018/0328945 A1 | 11/2018 | Nova | |
| 2019/0136298 A1* | 5/2019 | Apte | G16H 50/20 |
| 2019/0228856 A1* | 7/2019 | Leifer | G06N 3/08 |
| 2019/0304000 A1 | 10/2019 | Simpson | |
| 2022/0178946 A1* | 6/2022 | Rhyne | G01N 33/6893 |

OTHER PUBLICATIONS

Document: Katta R, Kramer MJ. Skin and diet: An update on the role of dietary change as a treatment strategy for skin disease. Skin Therapy Lett. Jan. 2018;23(1):1-5. Title: Skin and diet: An update on the role of dietary change as a treatment strategy for skin disease Date: Jan. 2, 20183 By: Katta.

Document: Journal of Allergy and Clinical Immunology. Nov. 1, 2012;130(5):1200-2; DOI: https://doi.org/10.1016/j.jaci.2012.06.027. Title: Selective elimination diet based on skin testing has suboptimal efficacy for adult eosinophilic esophagitis Date: Nov. 1, 2012 By: Javier Molina-Infante.

* cited by examiner

SYSTEMS AND METHODS FOR GENERATING AN INTEGUMENTARY DYSFUNCTION NOURISHMENT PROGRAM

FIELD OF THE INVENTION

The present invention generally relates to the field of artificial intelligence. In particular, the present invention is directed to a system and method for generating an integumentary dysfunction nourishment program.

BACKGROUND

Current edible suggestion systems do not account for the integumentary system of an individual. This leads to inefficiency of an edible suggestion system and a poor nutrition plan for the individual. This is further complicated by a lack of uniformity of nutritional plans, which results in dissatisfaction of individuals.

SUMMARY OF THE DISCLOSURE

In an aspect a system for generating an integumentary dysfunction nourishment program includes a computing device, the computing device configured to obtain an integumentary bundle element, identify a physiological group as a function of the integumentary bundle element, produce an integumentary profile as a function of the physiological group, wherein producing further comprises ascertaining an integumentary functional divergence as a function of the physiological group and an integumentary recommendation, and identifying the integumentary profile as a function of the integumentary functional divergence using an integumentary machine-learning model, determine an edible as a function of the integumentary profile, wherein determining further comprises receiving a nourishment composition from an edible directory, producing a nourishment demand as a function of the integumentary profile, and determining the edible as a function of the nourishment composition and nourishment demand using an edible machine-learning model, and generate a nourishment program as a function of the edible.

In another aspect a method for generating an integumentary dysfunction nourishment program includes obtaining, by a computing device, an integumentary bundle element, identifying, by the computing device, a physiological group as a function of the integumentary bundle element, producing, by the computing device, an integumentary profile as a function of the physiological group, wherein producing further comprises ascertaining an integumentary functional divergence as a function of the physiological group and an integumentary recommendation, and identifying the integumentary profile as a function of the integumentary functional divergence using an integumentary machine-learning model, determining, by the computing device, an edible as a function of the integumentary profile, wherein determining further comprises receiving a nourishment composition from an edible directory, producing a nourishment demand as a function of the integumentary profile, and determining the edible as a function of the nourishment composition and nourishment demand using an edible machine-learning model, and generating, by the computing device, a nourishment program as a function of the edible.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an integumentary dysfunction nourishment program. In an embodiment, this disclosure may obtain an integumentary bundle element that at least relates to an individual's integumentary system. Aspects of the present disclosure can be used to determine a physiological group and produce an integumentary profile as a function of the physiological group. This is so, at least in part, because this disclosure produces the profile as a function of a machine-learning model. Aspects of the present disclosure can be used to determine an edible that alters and/or modifies the integumentary profile. Aspects of the present disclosure allow for generating a nourishment program as a function of the edible. Exemplary embodiments illustrating aspects of the present disclosure are described below in the context of several specific examples.

Figure 1:
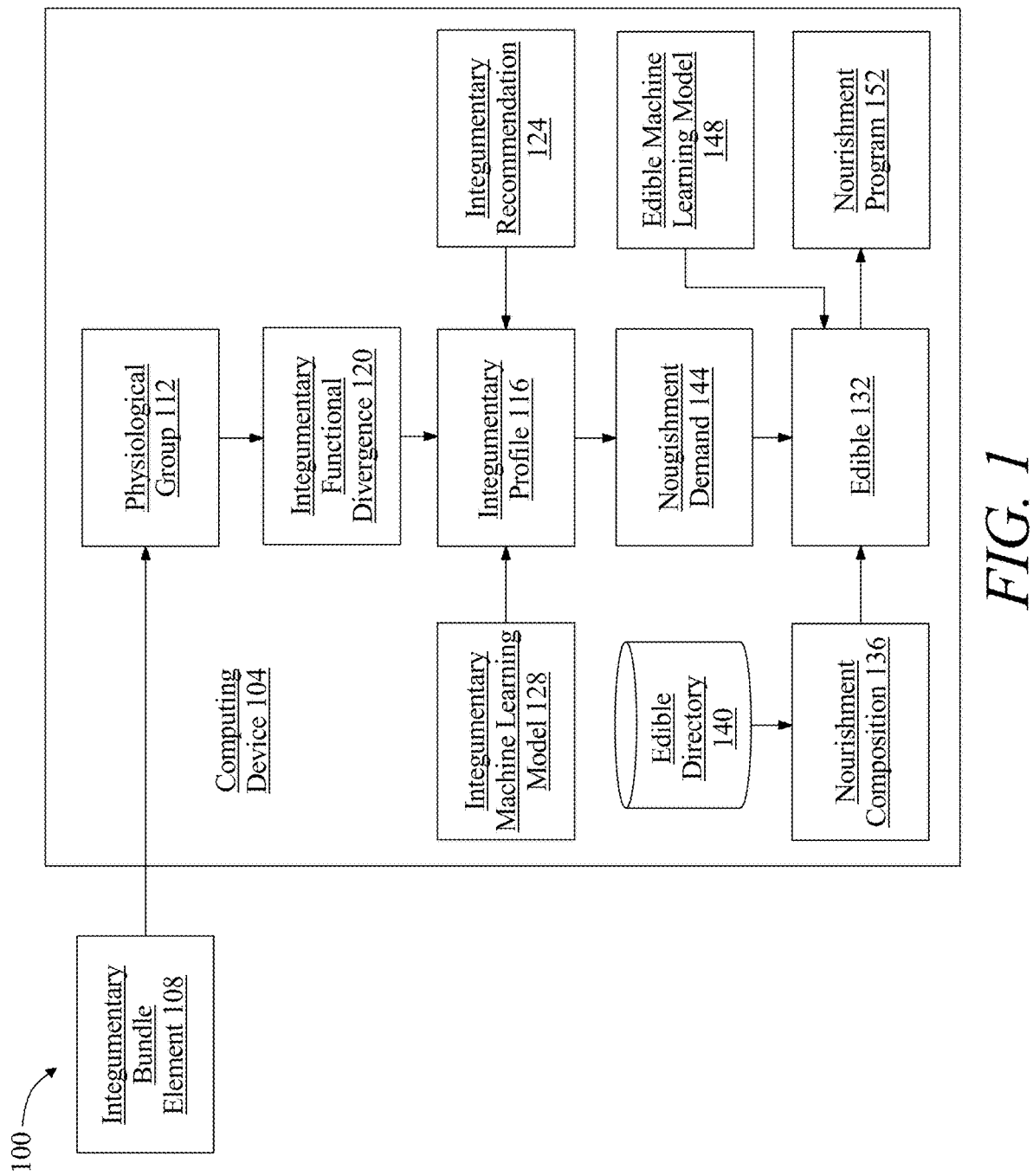
FIG. 1 is a block diagram illustrating an exemplary embodiment of a system for generating an integumentary dysfunction nourishment program.

Referring now to FIG. 1, an exemplary embodiment of a system 100 for generating an integumentary dysfunction nourishment program is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 obtains an integumentary bundle element 108. As used in this disclosure an "integumentary bundle element" is an element of data that denotes an individual's integumentary system health status. Integumentary bundle element 108 may include a biological sample. As used in this disclosure a "biological sample" is one or more biological specimens collected from an individual. Biological sample may include, without limitation, exhalate, blood, sputum, urine, saliva, feces, semen, and other bodily fluids, as well as tissue. Integumentary bundle element 108 may include a biological sampling device. Integumentary bundle element 108 may include one or more biomarkers. As used in this disclosure a "biomarker" is a molecule and/or chemical that identifies the health status of a user's integumentary system. As a non-limiting example, biomarkers may include, interleukin-1-a, interleukin-1 receptor antagonist, human B-defensin, hBD-1, collagen type I, collagen type IV, keratin, cytokines, angiogenesis receptors, VEGF, thrombospondin-1, thrombospondin-2, anti-microbial peptides, scleroproteins, and the like thereof. As a further non-limiting example, integumentary bundle element 108 may include datum from one or more devices that collect, store, and/or calculate one or more lights, voltages, currents, sounds, chemicals, pressures, and the like thereof that are associated with the user's integumentary system. Integumentary bundle element 108 may be received as a function of an integumentary system. As used in this disclosure an "integumentary system" is an organ and/or tissue system that relates to the skin, hypodermis, hair, nails, and/or associated glands. As a non-limiting example integumentary system may include glands such as, the sudoriferous gland, sebaceous gland, ceruminous gland, and/or mammary gland.

Still referring to FIG. 1, computing device 104 identifies a physiological group 112 as a function of integumentary bundle element 108. As used in this disclosure a "physiological group" is a group of integumentary bundle elements that relate to one or more functions of the integumentary system. As a non-limiting example a function of the integumentary system may include physical protection of the human body, wherein physical protection includes elements including but not limited to skin, dermis, hypodermis, adipose storage, protective films, nails, hair, and the like thereof. As a further non-limiting example, a function of the integumentary system may include groupings of integumentary bundle elements associated with immunity of the human body, such as but not limited to antimicrobial peptides, lipids, defensins, cathelicidins, sphingomyelins, glucosylceramides, and the like thereof. Additionally or alternatively, immunity of the human body may include myeloid and lymphoid cells present in the skin of an individual, such as Langerhans cells and/or dermal dendritic cells. As a further non-limiting example, physiological group 112 may include group of integumentary bundle elements associated with the synthesis of vitamin D. As a further non-limiting example, physiological group 112 may include group of integumentary bundle elements associated with the regulation of body temperature. Additionally or alternatively, physiological group 112 may include group of integumentary bundle elements associated with the sensation capabilities of a human body, including but not limited to pain, temperature, touch, vibration, and the like thereof.

Still referring to FIG. 1, computing device 104 may obtain integumentary bundle element 108 by receiving an input from a user. As used in this disclosure "input" is an element of datum that is obtained by the user. As a non-limiting example input may include a user entering a feeling of thirst, fatigue, lethargy, blurred vision, hot flashes, loss of memory, and the like thereof. Input may include one or more inputs from an informed advisor as a function of a medical assessment, wherein a "medical assessment" is an evaluation and/or estimation of the health status of an integumentary system. As used in this disclosure "informed advisor" is an individual that is skilled in a particular area relating to the study of the integumentary system. As a non-limiting example an informed advisor may include a medical professional who may assist and/or participate in the medical treatment of an individual's integumentary system including, but not limited to, dermatologists, functional medicine practitioners, chemical pathologists, family physicians, family physicians, and the like thereof. As a non-limiting example input may include an informed advisor that enters a medical assessment comprising a patch test, biopsy, scraping, examination using a wood light, Tzanck test, diascopy, and the like thereof Still referring to FIG. 1, computing device 104 produces an integumentary profile 116 as a function of physiological group 112. As used in this disclosure an "integumentary profile" is a profile of the integumentary system health status, wherein a health status is a relative level of wellness and illness of the integumentary system. As a non-limiting example integumentary profile 116 may include a profile comprising a weekend physical protection function of the integumentary system as a function of weakened structures. As a further non-limiting example, integumentary profile 116 may include a profile comprising concentrations of amino acids, proteins, lipids, nucleotides, coenzymes, minerals, and/or cofactors associated with the immune function. Computing device 104 produces integumentary profile 116 by ascertaining an integumentary functional divergence 120 as a function of physiological group 112 and an integumentary recommendation 124. As used in this disclosure an "integumentary functional divergence" is a quantitative value comprising the magnitude of divergence of pathophysiological element 112 and integumentary recommendation 124. As used in this disclosure an "integumentary recommendation" is a recommendation and/or guideline associated with the physiological group. As a non-limiting example, integumentary recommendation 124 may include one or more recommendations and/or guidelines as a function of improving an integumentary health status. As a further non-limiting example, integumentary recommendation 124 may include one or more recommendations and/or guidelines as a function of maintaining a present integumentary health status. As a non-limiting example, integumentary recommendation 124 may include a recommendation that 400 to 800 IU of vitamin D is produced each day. Integumentary recommendation 124 may be received from a peer review, an advisor association, a medical website, and the like thereof, described in detail below, in reference to FIG. 4. As a non-limiting example, integumentary recommendation 124 may include a guideline that specifies that an epidermal layer should be maintained between 0.05 to 0.1 mm and/or 1.97 to 3.94 mils in thickness. As a further non-limiting example, integumentary recommendation 124 may include a guideline that identifies a fingernail growth rate of 0.7 to 0.84 mm and/or 27.56 to 33.07 mils per week. Additionally or alternatively, integumentary recommendation may include one or more recommendations from the National Healthy Skin Guideline. As a non-limiting example, integumentary recommendation may include one or more recommendations such as a skin pH of 4.5 to 5.5. As a further non-limiting example, integumentary recommendation may recommend that a skin hydration is between a range of 0-130 AU. As a further non-limiting example, integumentary recommendations may include a range of 2-13 g/m$^2$ h for the total amount of trans-epidermal water loss.

Still referring to FIG. 1, integumentary functional divergence 120 may be ascertained by comparing pathophysiological element 112 to integumentary recommendation 124 and determining a health status grading. As used in this disclosure a "health status grading" is a grade and/or rank associated with a health status of a user integumentary system. As a non-limiting example, health status grading may include a low health status, wherein a low health status may indicate a user has a high risk for developing integumentary complications, wherein an "integumentary complication" is one or more process that diverge from integumentary recommendation 124 associated with physiological group 112. Integumentary functional divergence 120 may include a transgression parameter. As used in this disclosure a "transgression parameter" is a parameter that identifies one or more divergences that exceed a variance limit. As a non-limiting example, transgression parameter may determine that an integumentary functional divergence should not exceed 7 for the biomarker interleukin 1. As a further non-limiting, transgression parameter may determine that integumentary functional divergence should not exceed 2 for VEGF. As a further non-limiting example, a physiological group may indicate a value of 2 for hair growth, wherein the integumentary recommendation of for hair growth is 50, denoting a low health status grading for hair growth and a high risk for developing an integumentary complication.

Still referring to FIG. 1, computing device 104 produces integumentary profile 116 as a function of integumentary functional divergence 120 using an integumentary machine-learning model 128. As used in this disclosure "integumentary machine-learning model" is a machine-learning model to produce an integumentary profile output given physiological groups and integumentary recommendations as inputs; this is in contrast to a non-machine learning software program where the commands to be executed are determined in advance by a user and written in a programming language. Integumentary machine-learning model 128 may include one or more integumentary machine-learning processes such as supervised, unsupervised, or reinforcement machine-learning processes that computing device 104 and/or a remote device may or may not use in the determination of integumentary profile 116. As used in this disclosure "remote device" is an external device to computing device 104. An integumentary machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train integumentary machine-learning process as a function of an integumentary training set. As used in this disclosure "integumentary training set" is a training set that correlates a physiological group and/or integumentary recommendation to an integumentary profile. For example, and without limitation, a physiological group of a vibrational sensation of 2 hertz and an integumentary recommendation of 10-50 hertz of vibrational sensation may relate to an integumentary profile of reduced vibrational sensitivity. The integumentary training set may be received as a function of user-entered valuations of physiological groups, integumentary recommendations, and/or integumentary profiles. Computing device 104 may receive integumentary training set by receiving correlations of physiological groups, and/or integumentary recommendations that were previously received and/or determined during a previous iteration of determining integumentary profiles. The integumentary training set may be received by one or more remote devices that at least correlate a physiological group and/or integumentary recommendation to an integumentary profile, wherein a remote device is an external device to computing device 104, as described above. The integumentary training set may be received in the form of one or more user-entered correlations of a physiological group and/or integumentary recommendation to an integumentary profile. Additionally or alternatively, a user may include an informed advisor, wherein an informed advisor may include, without limitation, dermatologists, functional medicine practitioners, chemical pathologists, family physicians, family physicians, and the like thereof.

Still referring to FIG. 1, computing device 104 may receive integumentary machine-learning model from a remote device that utilizes one or more integumentary machine learning processes, wherein a remote device is described above in detail. For example, and without limitation, a remote device may include a computing device, external device, processor, and the like thereof. Remote device may perform the integumentary machine-learning process using the integumentary training set to generate integumentary profile 116 and transmit the output to computing device 104. Remote device may transmit a signal, bit, datum, or parameter to computing device 104 that at least relates to integumentary profile 116. Additionally or alternatively, the remote device may provide an updated machine-learning model. For example, and without limitation, an updated machine-learning model may be comprised of a firmware update, a software update, an integumentary machine-learning process correction, and the like thereof. As a non-limiting example a software update may incorporate a new physiological group that relates to a modified integumentary recommendation. Additionally or alternatively, the updated machine learning model may be transmitted to the remote device, wherein the remote device may replace the integumentary machine-learning model with the updated machine-learning model and determine the integumentary profile as a function of the physiological group using the updated machine-learning model. The updated machine-learning model may be transmitted by the remote device and received by computing device 104 as a software update, firmware update, or corrected integumentary machine-learning model. For example, and without limitation integumentary machine-learning model may utilize a random forest machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658, filed on Nov. 30, 2020, and entitled "A SYSTEM AND METHOD FOR GENERATING A DYNAMIC WEIGHTED COMBINATION," the entirety of which is incorporated herein by reference.

Still referring to FIG. 1, computing device 104 may identify integumentary profile 116 by identifying an integumentary dysfunction. As used in this disclosure an "integumentary dysfunction" is an ailment and/or collection of ailments that impact an individual's integumentary system. As a non-limiting example, integumentary dysfunction may include basal cell carcinoma, squamous cell carcinoma, melanoma, eczema, acne, keloids, alopecia areata, folliculitis, male pattern balding, onychomycosis, pitting, koilonychia, clubbing, seborrheic dermatitis, hyperhidrosis, and the like thereof. Integumentary dysfunction may be determined as a function of one or more dysfunction machine-learning models. As used in this disclosure, a "dysfunction machine-learning model" is a machine-learning model to produce an integumentary dysfunction output given integumentary bundle element 108 and/or physiological group 112 as inputs; this is in contrast to a non-machine learning software program where the commands to be executed are determined in advance by a user and written in a programming language. Dysfunction machine-learning model may include one or more dysfunction machine-learning processes such as supervised, unsupervised, or reinforcement machine-learning processes that computing device 104 and/or a remote device may or may not use in the determination of integumentary dysfunction. A dysfunction machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train dysfunction machine-learning process as a function of a dysfunction training set. As used in this disclosure, a "dysfunction training set" is a training set that correlates at least an integumentary enumeration and an integumentary system effect to an integumentary dysfunction. As used in this disclosure, an "integumentary enumeration" is a measurable value associated with the integumentary bundle element. As used in this disclosure, an "integumentary system effect" is an impact and/or effect the physiological group has on the integumentary system of an individual. As a non-limiting example an integumentary enumeration of 17 may be relate to an integumentary system effect of focal abnormalization of keratinization of the nail matrix wherein an integumentary dysfunction of pitting may be determined. The dysfunction training set may be received as a function of user-entered valuations of integumentary enumerations, integumentary system effects, and/or integumentary dysfunctions. Computing device 104 may receive dysfunction training set by receiving correlations of integumentary enumerations and/or integumentary system effects that were previously received and/or determined during a previous iteration of determining integumentary dysfunctions. The dysfunction training set may be received by one or more remote devices that at least correlate an integumentary enumeration and/or integumentary system effect to an integumentary dysfunction, wherein a remote device is an external device to computing device 104, as described above. The dysfunction training set may be received in the form of one or more user-entered correlations of an integumentary enumeration and integumentary system effect to an integumentary dysfunction. Additionally or alternatively, a user may include an informed advisor, wherein an informed advisor may include, without limitation, dermatologists, functional medicine practitioners, chemical pathologists, family physicians, family physicians, and the like thereof Still referring to FIG. 1, computing device 104 may receive dysfunction machine-learning model from the remote device that utilizes one or more dysfunction machine learning processes, wherein a remote device is described above in detail. For example, and without limitation, a remote device may include a computing device, external device, processor, and the like thereof. The remote device may perform the dysfunction machine-learning process using the dysfunction training set to generate integumentary dysfunction and transmit the output to computing device 104. The remote device may transmit a signal, bit, datum, or parameter to computing device 104 that at least relates to integumentary dysfunctions. Additionally or alternatively, the remote device may provide an updated machine-learning model. For example, and without limitation, an updated machine-learning model may be comprised of a firmware update, a software update, a dysfunction machine-learning process correction, and the like thereof. As a non-limiting example a software update may incorporate a new integumentary enumeration that relates to a modified integumentary system effect. Additionally or alternatively, the updated machine learning model may be transmitted to the remote device, wherein the remote device may replace the dysfunction machine-learning model with the updated machine-learning model and determine the integumentary dysfunction as a function of the integumentary enumeration using the updated machine-learning model. The updated machine-learning model may be transmitted by the remote device and received by computing device 104 as a software update, firmware update, or corrected dysfunction machine-learning model. For example, and without limitation dysfunction machine-learning model may utilize a Naïve bayes machine-learning process, wherein the updated machine-learning model may incorporate decision tree machine-learning process.

Still referring to FIG. 1, computing device 104 determines an edible 132 as a function of integumentary profile 116. As used in this disclosure an "edible" is a source of nourishment that may be consumed by a user such that the user may absorb the nutrients from the source. For example and without limitation, an edible may include legumes, plants, fungi, nuts, seeds, breads, dairy, eggs, meat, cereals, rice, seafood, desserts, dried foods, dumplings, pies, noodles, salads, stews, soups, sauces, sandwiches, and the like thereof. Computing device 104 identifies edible 132 as a function of receiving a nourishment composition 136. As used in this disclosure a "nourishment composition" is a list and/or compilation of all of the nutrients contained in an edible. As a non-limiting example nourishment composition 136 may include one or more quantities and/or amounts of total fat, including saturated fat and/or trans-fat, cholesterol, sodium, total carbohydrates, including dietary fiber and/or total sugars, protein, vitamin A, vitamin C, thiamin, riboflavin, niacin, pantothenic acid, vitamin b6, folate, biotin, vitamin B12, vitamin D, vitamin E, vitamin K, calcium, iron, phosphorous, iodine, magnesium, zinc, selenium, copper, manganese, chromium, molybdenum, chloride, and the like thereof. Nourishment composition 136 may be obtained as a function of an edible directory 140, wherein an "edible directory" is a database of edibles that may be identified as a function of one or more metabolic components, as described in detail below, in reference to FIG. 3.

Still referring to FIG. 1, computing device 104 produces a nourishment demand 144 as a function of integumentary profile 116. As used in this disclosure a "nourishment demand" is requirement and/or necessary amount of nutrients required for a user to consume. As a non-limiting example, nourishment demand may include a user requirement of 65 g of protein to be consumed per day. Nourishment demand 144 may be determined as a function of receiving a nourishment goal. As used in this disclosure a "nourishment goal" is a recommended amount of nutrients that a user should consume. Nourishment goal may be identified by one or more organizations that relate to, represent, and/or study metabolic functions in humans, such as the American Medical Association, American Academy of Dermatology, American Cancer Society, Skin Cancer Foundation, National Alopecia Areata Foundation, National Institute of Arthritis and Musculoskeletal and Skin Diseases, American Osteopathic College of Dermatology, and the like thereof.

Still referring to FIG. 1, computing device 104 identifies edible 132 as a function of nourishment composition 136, nourishment demand 144, and an edible machine-learning model 148. As used in this disclosure a "edible machine-learning model" is a machine-learning model to produce an edible output given nourishment compositions and nourishment demands as inputs; this is in contrast to a non-machine learning software program where the commands to be executed are determined in advance by a user and written in a programming language. Edible machine-learning model 148 may include one or more edible machine-learning processes such as supervised, unsupervised, or reinforcement machine-learning processes that computing device 104 and/or a remote device may or may not use in the determination of edible 132, wherein a remote device is an external device to computing device 104 as described above in detail. An edible machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train edible machine-learning process as a function of an edible training set. As used in this disclosure an "edible training set" is a training set that correlates at least nourishment composition and nourishment demand to an edible. For example, and without limitation, nourishment composition of 12 mg of antioxidants and a nourishment demand of 8 g of antioxidants as a function of chronic acne may relate to an edible of carrots. The edible training set may be received as a function of user-entered valuations of nourishment compositions, nourishment demands, and/or edibles. Computing device 104 may receive edible training set by receiving correlations of nourishment compositions and/or nourishment demands that were previously received and/or determined during a previous iteration of determining edibles. The edible training set may be received by one or more remote devices that at least correlate a nourishment composition and nourishment demand to an edible, wherein a remote device is an external device to computing device 104, as described above. Edible training set may be received in the form of one or more user-entered correlations of a nourishment composition and/or nourishment demand to an edible. Additionally or alternatively, a user may include an informed advisor, wherein an informed advisor may include, without limitation, dermatologists, functional medicine practitioners, chemical pathologists, family physicians, family physicians, and the like thereof.

Still referring to FIG. 1, edible machine-learning model 148 may identify edible 132 as a function of one or more classifiers. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div (B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naive Bayes algorithm may be generated by first transforming training data into a frequency table. Computing device 104 may then calculate a likelihood table by calculating probabilities of different data entries and classification labels. Computing device 104 may utilize a naive Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{2}\alpha_{i}^{2}}$, where a is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 may receive edible machine-learning model 148 from a remote device that utilizes one or more edible machine learning processes, wherein remote device is described above in detail. For example, and without limitation, remote device may include a computing device, external device, processor, and the like thereof. Remote device may perform the edible machine-learning process using the edible training set to generate edible 132 and transmit the output to computing device 104. Remote device may transmit a signal, bit, datum, or parameter to computing device 104 that at least relates to edible 132. Additionally or alternatively, the remote device may provide an updated machine-learning model. For example, and without limitation, an updated machine-learning model may be comprised of a firmware update, a software update, an edible machine-learning process correction, and the like thereof. As a non-limiting example a software update may incorporate a new nourishment composition that relates to a modified nourishment demand. Additionally or alternatively, the updated machine learning model may be transmitted to the remote device, wherein the remote device may replace the edible machine-learning model with the updated machine-learning model and determine the edible as a function of the nourishment demand using the updated machine-learning model. The updated machine-learning model may be transmitted by the remote device and received by computing device 104 as a software update, firmware update, or corrected edible machine-learning model. For example, and without limitation an edible machine-learning model may utilize a neural net machine-learning process, wherein the updated machine-learning model may incorporate polynomial regression machine-learning process. Updated machine learning model may additionally or alternatively include any machine-learning model used as an updated machine learning model as described in U.S. Nonprovisional application Ser. No. 17/106,658, filed on Nov. 30, 2020, and entitled "A SYSTEM AND METHOD FOR GENERATING A DYNAMIC WEIGHTED COMBINATION," the entirety of which is incorporated herein by reference.

Still referring to FIG. 1, computing device 104 may identify edible as a function of a likelihood parameter. As used in this disclosure a "likelihood parameter" is a parameter that identifies the probability of a user to consume an edible. As a non-limiting example likelihood parameter may identify a high probability that a user will consume an edible of chicken. As a further non-limiting example likelihood parameter may identify a low probability that a user will consume an edible of anchovies. Likelihood parameter may be determined as a function of a user taste profile. As used in this disclosure a "user taste profile" is a profile of a user that identifies one or more desires, preferences, wishes, and/or wants that a user has. As a non-limiting example a user taste profile may include a user's preference for chicken flavor and/or crunchy textured edibles. Likelihood parameter may be determined as a function of an edible profile. As used in this disclosure an "edible profile" is taste of an edible is the sensation of flavor perceived in the mouth and throat on contact with the edible. Edible profile may include one or more flavor variables. As used in this disclosure a "flavor variable" is a variable associated with the distinctive taste of an edible, wherein a distinctive may include, without limitation sweet, bitter, sour, salty, umami, cool, and/or hot. Edible profile may be determined as a function of receiving flavor variable from a flavor directory. As used in this disclosure a "flavor directory" is a database or other data structure including flavors for an edible. As a non-limiting example flavor directory may include a list and/or collection of edibles that all contain umami flavor variables. As a further non-limiting example flavor directory may include a list and/or collection of edibles that all contain sour flavor variables. Flavor directory may be implemented similarly to edible directory 140 as described below in detail, in reference to FIG. 3. Likelihood parameter may alternatively or additionally include any user taste profile and/or edible profile used as a likelihood parameter as described in U.S. Nonprovisional application Ser. No. 17/032,080, filed on Sep. 25, 2020, and entitled "METHODS, SYSTEMS, AND DEVICES FOR GENERATING A REFRESHMENT INSTRUCTION SET BASED ON INDIVIDUAL PREFERENCES," the entirety of which is incorporated herein by reference.

Still referring to FIG. 1, computing device 104 generates a nourishment program 152 as a function of edible 132. As used in this disclosure a "nourishment program" is a program consisting of one or more edibles that are to be consumed over a given time period, wherein a time period is a temporal measurement such as seconds, minutes, hours, days, weeks, months, years, and the like thereof. As a non-limiting example nourishment program 152 may consist of recommending oysters for 8 days. As a further non-limiting example nourishment program 152 may recommend tofu for a first day, milk and cookies for a second day, and artichokes for a third day. Nourishment program 152 may include one or more diet programs such as paleo, keto, vegan, vegetarian, and the like thereof. Computing device 104 may develop nourishment program 152 as a function of an integumentary outcome. As used in this disclosure a "integumentary outcome" is an outcome that an edible may generate according to a predicted and/or purposeful plan. As a non-limiting example, integumentary outcome may include a treatment outcome. As used in this disclosure a "treatment outcome" is an intended outcome that is designed to at least reverse and/or eliminate integumentary bundle element 108 associated with integumentary profile 116 and/or integumentary dysfunction. As a non-limiting example, a treatment outcome may include reversing the effects of the integumentary dysfunction alopecia. As a further non-limiting example, a treatment outcome includes reversing the integumentary dysfunction of onychomycosis. Integumentary outcome may include a prevention outcome. As used in this disclosure a "prevention outcome" is an intended outcome that is designed to at least prevent and/or avert integumentary bundle element 108 associated with integumentary profile 116 and/or integumentary dysfunction. As a non-limiting example, a prevention outcome may include preventing the development of the integumentary dysfunction of koilonychia.

Still referring to FIG. 1, computing device 104 may develop nourishment program 152 as a function of edible 132 and treatment outcome using a nourishment machine-learning model. As used in this disclosure a "nourishment machine-learning model" is a machine-learning model to produce a nourishment program output given edibles and/or integumentary outcomes as inputs; this is in contrast to a non-machine learning software program where the commands to be executed are determined in advance by a user and written in a programming language. Nourishment machine-learning model may include one or more nourishment machine-learning processes such as supervised, unsupervised, or reinforcement machine-learning processes that computing device 104 and/or a remote device may or may not use in the development of nourishment program 152. Nourishment machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train nourishment machine-learning process as a function of a nourishment training set. As used in this disclosure a "nourishment training set" is a training set that correlates an integumentary outcome to an edible. The nourishment training set may be received as a function of user-entered edibles, integumentary outcomes, and/or nourishment programs. For example, and without limitation, an integumentary outcome of treating hyperhidrosis may correlate to an edible of melon. Computing device 104 may receive nourishment training by receiving correlations of integumentary outcomes and/or edibles that were previously received and/or determined during a previous iteration of developing nourishment programs. The nourishment training set may be received by one or more remote devices that at least correlate an integumentary outcome and/or edible to a nourishment program, wherein a remote device is an external device to computing device 104, as described above. Nourishment training set may be received in the form of one or more user-entered correlations of an integumentary outcome and/or edible to a nourishment program. Additionally or alternatively, a user may include an informed advisor, wherein an informed advisor may include, without limitation, dermatologists, functional medicine practitioners, chemical pathologists, family physicians, family physicians, and the like thereof.

Still referring to FIG. 1, computing device 104 may receive nourishment machine-learning model from the remote device that utilizes one or more nourishment machine learning processes, wherein a remote device is described above in detail. For example, and without limitation, a remote device may include a computing device, external device, processor, and the like thereof. The remote device may perform the nourishment machine-learning process using the nourishment training set to develop nourishment program 152 and transmit the output to computing device 104. The remote device may transmit a signal, bit, datum, or parameter to computing device 104 that at least relates to nourishment program 152. Additionally or alternatively, the remote device may provide an updated machine-learning model. For example, and without limitation, an updated machine-learning model may be comprised of a firmware update, a software update, a nourishment machine-learning process correction, and the like thereof. As a non-limiting example a software update may incorporate a new integumentary outcome that relates to a modified edible. Additionally or alternatively, the updated machine learning model may be transmitted to the remote device, wherein the remote device may replace the nourishment machine-learning model with the updated machine-learning model and develop the nourishment program as a function of the integumentary outcome using the updated machine-learning model. The updated machine-learning model may be transmitted by the remote device and received by computing device 104 as a software update, firmware update, or corrected nourishment machine-learning model. For example, and without limitation nourishment machine-learning model may utilize a neural net machine-learning process, wherein the updated machine-learning model may incorporate decision tree machine-learning processes.

Figure 2:
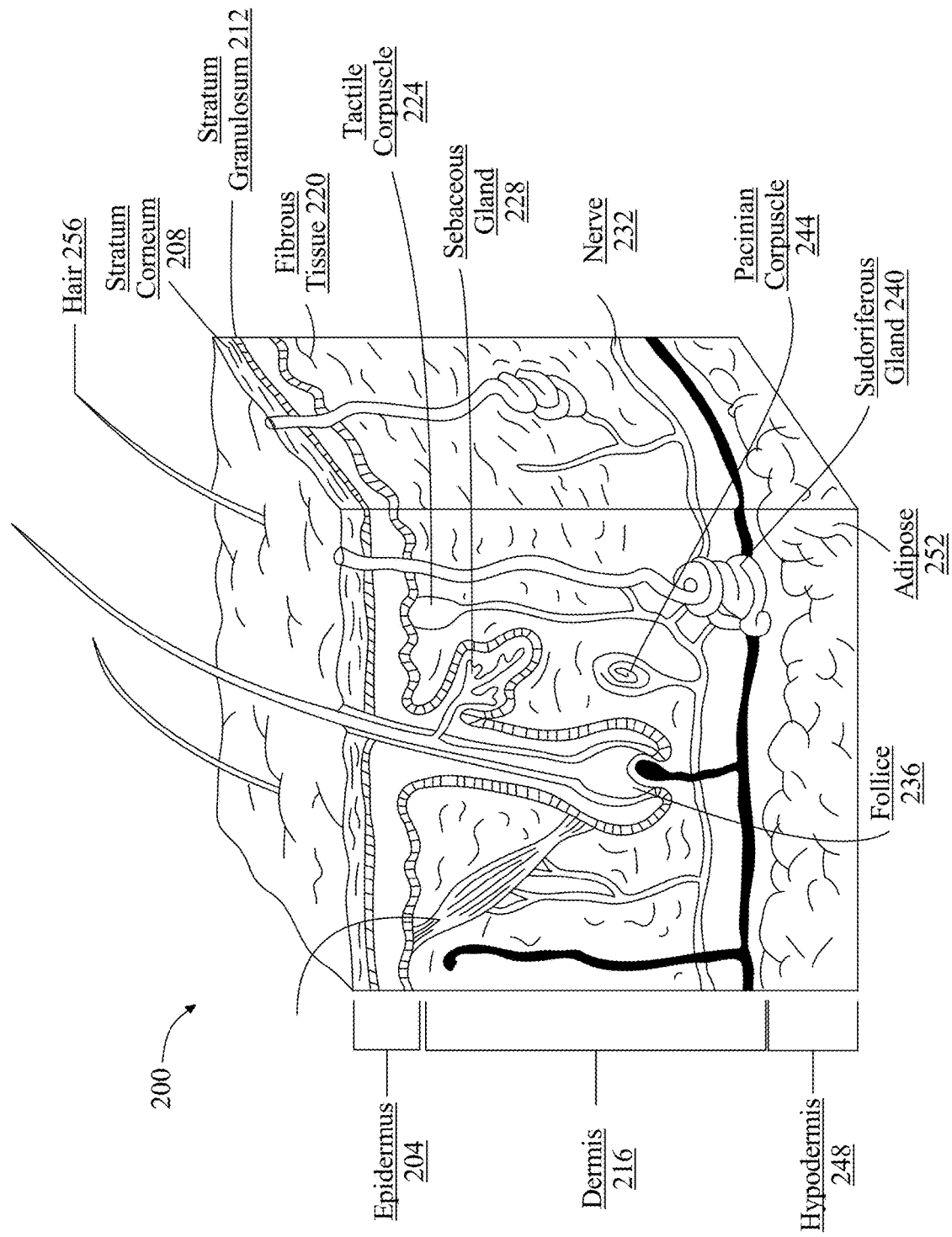
FIG. 2 is a block diagram of an exemplary embodiment of an integumentary system according to an embodiment of the invention.

Now referring to FIG. 2, an exemplary embodiment 200 of an integumentary system is illustrated. Integumentary system may include an epidermis 204. As used in this disclosure an "epidermis" is the surface epithelium of the skin. As a non-limiting example epidermis 204 may include a stratum corneum 208. As used in this disclosure a "stratum corneum" is the outermost layer of epithelial cells composed of 10-30 layers of polyhedral anucleated corneocytes. Stratum corneum 208 may include a protein envelop underneath a plasma membrane that is filled with water-retaining keratin proteins, attached through corneodesmosomes. Epidermis 204 may include a stratum granulosum 212. As used in this disclosure a "stratum granulosum" is an anucleated keratinocyte, wherein the cytoplasm appears to be granular. As a non-limiting example stratum granulosum 212 may include lipids within lamellar bodies that are released into the extracellular space through exocytosis to form a lipid barrier.

Still referring to FIG. 2, integumentary system may include a dermis 216. As used in this disclosure a "dermis" is a layer of skin between the epidermis and subcutaneous tissue. Dermis 216 may include a fibrous tissue 220. As used in this this disclosure a "fibrous tissue" is dense irregular connective tissue that cushions the body from stress and strain. Dermis 216 may include a tactile corpuscle 224. As sued in this disclosure a "tactile corpuscle" is a mechanoreceptor that is sensitive to light touch. As a non-limiting example, tactile corpuscle 224 may include sensing vibrations between 10 hertz and 50 hertz. Dermis 216 may include a sebaceous gland 228. As used in this disclosure a "sebaceous gland" is an exocrine gland that secretes an oily and/or waxy matter. As a non-limiting example sebaceous gland 228 may include secreting sebum, wherein sebum is composed of triglycerides, wax esters, squalene, free fatty acids, and the like thereof. Dermis 216 may include a nerve 232. As used in this disclosure a "nerve" is an enclosed, cable-like bundle of nerve fibers. As a non-limiting example, nerve 232 may include afferent nerves, efferent nerves, mixed nerves, spinal nerves, cranial nerves, and the like thereof. Dermis 216 may include a follicle 236. As used in this disclosure a "follicle" is a secretory cavity, sac, and/or gland. As a non-limiting example, follicle 236 may include a hair bulb, hair matrix, and/or hair papilla. Dermis 216 may include a sudoriferous gland 240. As used in this disclosure a "sudoriferous gland" is a small tubular structure that produces sweat. As a non-limiting example sudoriferous gland 240 may include eccrine sweat gland distributed and/or an apocrine sweat gland. Dermis 216 may include a Pacinian corpuscle 244. As used in this disclosure a "Pacinian corpuscle" is an encapsulated ending of a sensory nerve that senses vibration and/or pressure. Pacinian corpuscle 244 may include a phasic receptor that detects up to 250 hertz.

Still referring to FIG. 2, integumentary system may include a hypodermis 248. As used in this disclosure a "hypodermis" is the lowermost layer of the integumentary system. As a non-limiting example hypodermis 248 may include fibroblasts, macrophages, and the like thereof. Hypodermis 248 may include an adipose 252. As used in this disclosure an "adipose" is loose connective tissue composed of adipocytes. As a non-limiting example, adipose 252 may include a stromal vascular fraction of cells including, but not limited to preadipocytes, fibroblasts, vascular endothelial cells, and a variety of immune cells such as adipose tissue macrophages.

Figure 3:
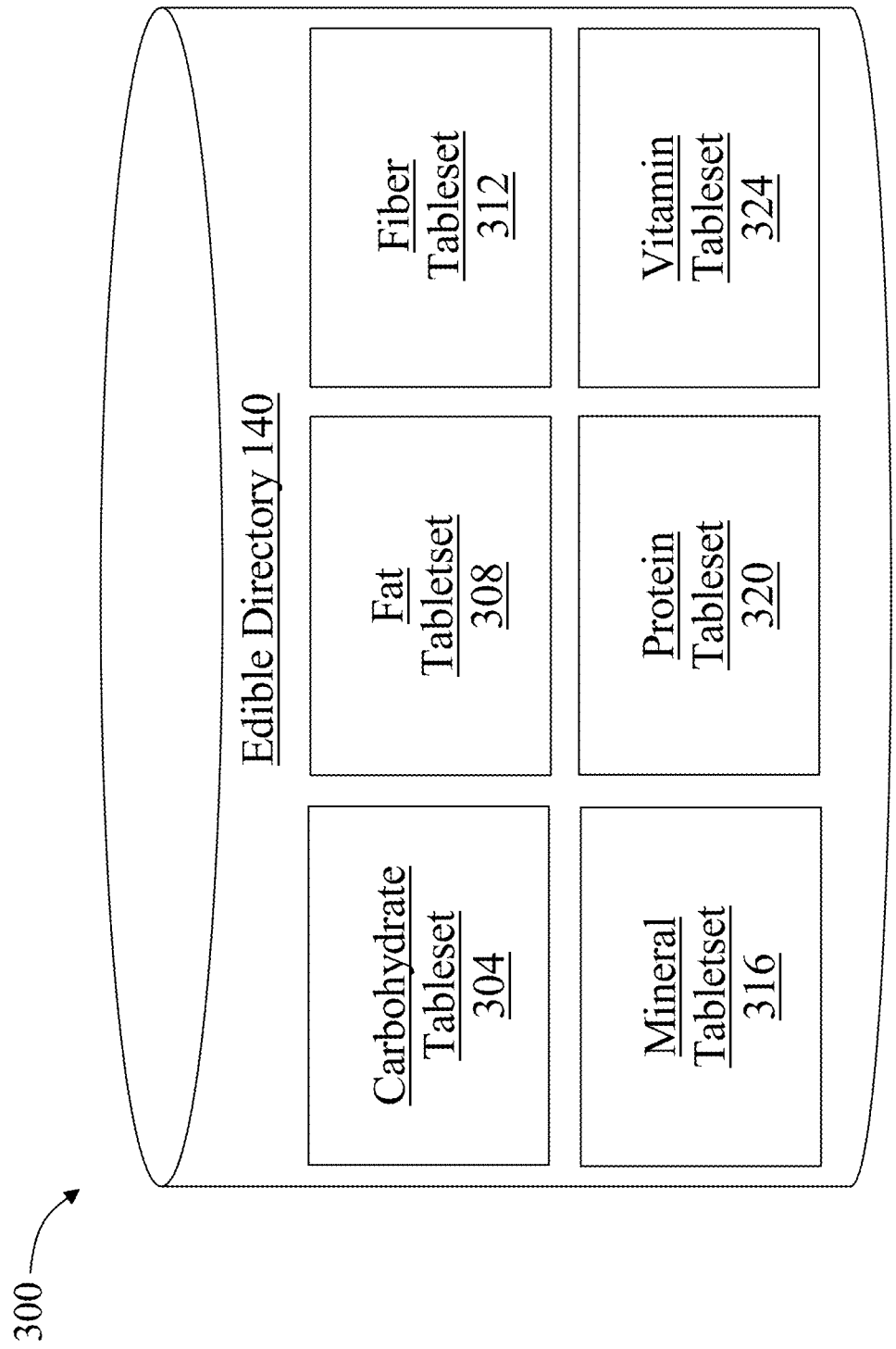
FIG. 3 is a block diagram of an exemplary embodiment of an edible directory according to an embodiment of the invention.

Now referring to FIG. 3, an exemplary embodiment 300 of an edible directory 140 according to an embodiment of the invention is illustrated. Edible directory 140 may be implemented, without limitation, as a relational databank, a key-value retrieval databank such as a NOSQL databank, or any other format or structure for use as a databank that a person skilled in the art would recognize as suitable upon review of the entirety of this disclosure. Edible directory 140 may alternatively or additionally be implemented using a distributed data storage protocol and/or data structure, such as a distributed hash table or the like. Edible directory 140 may include a plurality of data entries and/or records as described above. Data entries in a databank may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a databank may store, retrieve, organize, and/or reflect data and/or records as used herein, as well as categories and/or populations of data consistently with this disclosure. Edible directory 140 may include a carbohydrate tableset 304. Carbohydrate tableset 304 may relate to a nourishment composition of an edible with respect to the quantity and/or type of carbohydrates in the edible. As a non-limiting example, carbohydrate tableset 304 may include monosaccharides, disaccharides, oligosaccharides, polysaccharides, and the like thereof. Edible directory 140 may include a fat tableset 308. Fat tableset 308 may relate to a nourishment composition of an edible with respect to the quantity and/or type of esterified fatty acids in the edible. Fat tableset 308 may include, without limitation, triglycerides, monoglycerides, diglycerides, phospholipids, sterols, waxes, and free fatty acids. Edible directory 140 may include a fiber tableset 312. Fiber tableset 312 may relate to a nourishment composition of an edible with respect to the quantity and/or type of fiber in the edible. As a non-limiting example, fiber tableset 312 may include soluble fiber, such as beta-glucans, raw guar gum, psyllium, inulin, and the like thereof as well as insoluble fiber, such as wheat bran, cellulose, lignin, and the like thereof. Edible directory 140 may include a mineral tableset 316. Mineral tableset 316 may relate to a nourishment composition of an edible with respect to the quantity and/or type of minerals in the edible. As a non-limiting example, mineral tableset 316 may include calcium, phosphorous, magnesium, sodium, potassium, chloride, sulfur, iron, manganese, copper, iodine, zing, cobalt, fluoride, selenium, and the like thereof. Edible directory 140 may include a protein tableset 320. Protein tableset 320 may relate to a nourishment composition of an edible with respect to the quantity and/or type of proteins in the edible. As a non-limiting example, protein tableset 320 may include amino acids combinations, wherein amino acids may include, without limitation, alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, and the like thereof. Edible directory 140 may include a vitamin tableset 324. Vitamin tableset 324 may relate to a nourishment composition of an edible with respect to the quantity and/or type of vitamins in the edible. As a non-limiting example, vitamin tableset 324 may include vitamin A, vitamin $B_1$, vitamin $B_2$, vitamin $B_3$, vitamin $B_5$, vitamin $B_6$, vitamin $B_7$, vitamin $B_9$, vitamin $B_{12}$, vitamin C, vitamin D, vitamin E, vitamin K, and the like thereof.

Figure 4:
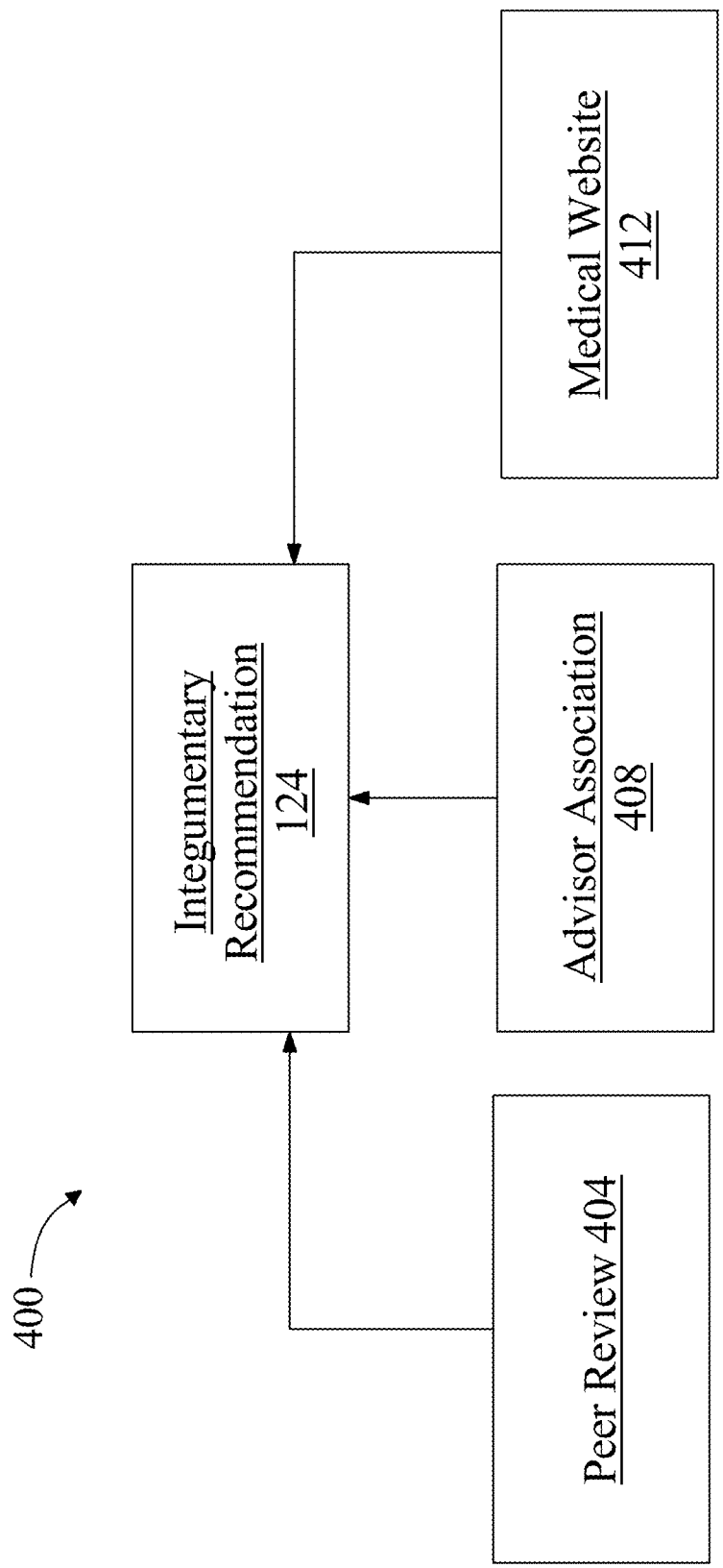
FIG. 4 is a block diagram of an exemplary embodiment of an integumentary recommendation according to an embodiment of the invention.

Now referring to FIG. 4, an exemplary embodiment 400 of an integumentary recommendation 124 according to an embodiment of the invention is illustrated. Integumentary recommendation 124 may include a peer review 404. As used in this disclosure a "peer review" is a source that establishes a guideline as a function of an evaluation conducted by one or more people with similar competencies. As a non-limiting example peer review 404 may include professional peer reviews, scholarly peer reviews, government peer reviews, medical peer reviews, technical peer reviews, and the like thereof. Integumentary recommendation 124 may include an informed advisor association 408. As used in this disclosure an "informed advisor association" is a source that establishes as a function of one or more committees, organizations, and/or groups that at least determine and/or organize integumentary functional divergences. As a non-limiting example informed advisor association 408 may include the American Medical Association, American Academy of Dermatology, American Cancer Society, Skin Cancer Foundation, National Alopecia Areata Foundation, National Institute of Arthritis and Musculoskeletal and Skin Diseases, American Osteopathic College of Dermatology, and the like thereof. Integumentary recommendation 124 may include a medical website tableset 412. As used in this disclosure a "medical website" is a source that establishes a guideline as a function of one or more online and/or web-based medical recommendations. As a non-limiting example medical website 412 may include Medline Plus, Drugs.com, Mayo Clinic, Orphanet, Medgadget, WebMD, Health.gov, SPM ePatients blog, and the like thereof.

Figure 5:
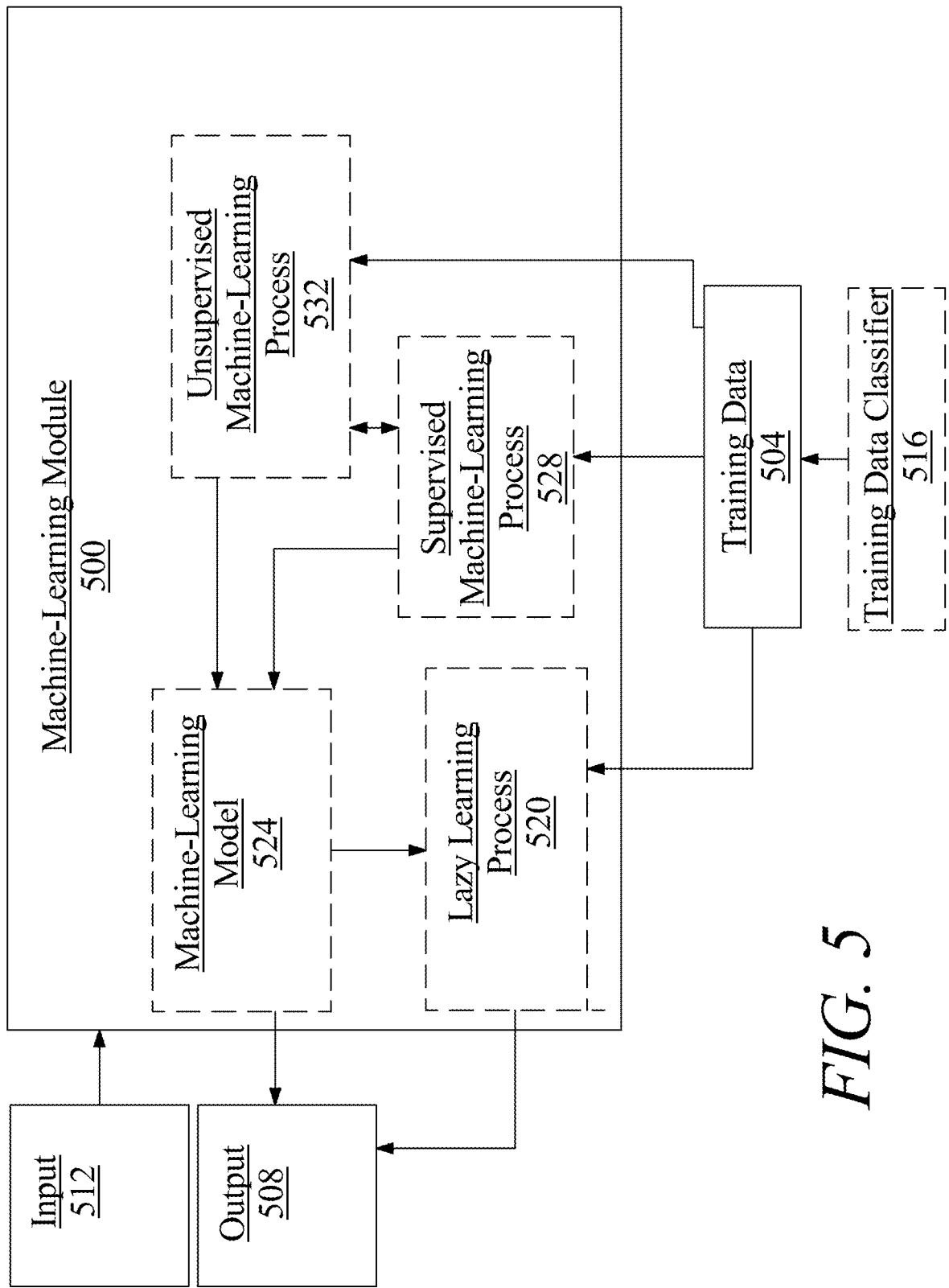
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, inputs of an integumentary functional divergence may be an input wherein an output of an integumentary profile may be produced.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of integumentary functional divergences such as a large divergence, medium divergence, and/or low divergence.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include nourishment compositions and/or nourishment demands as described above as inputs, edibles as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
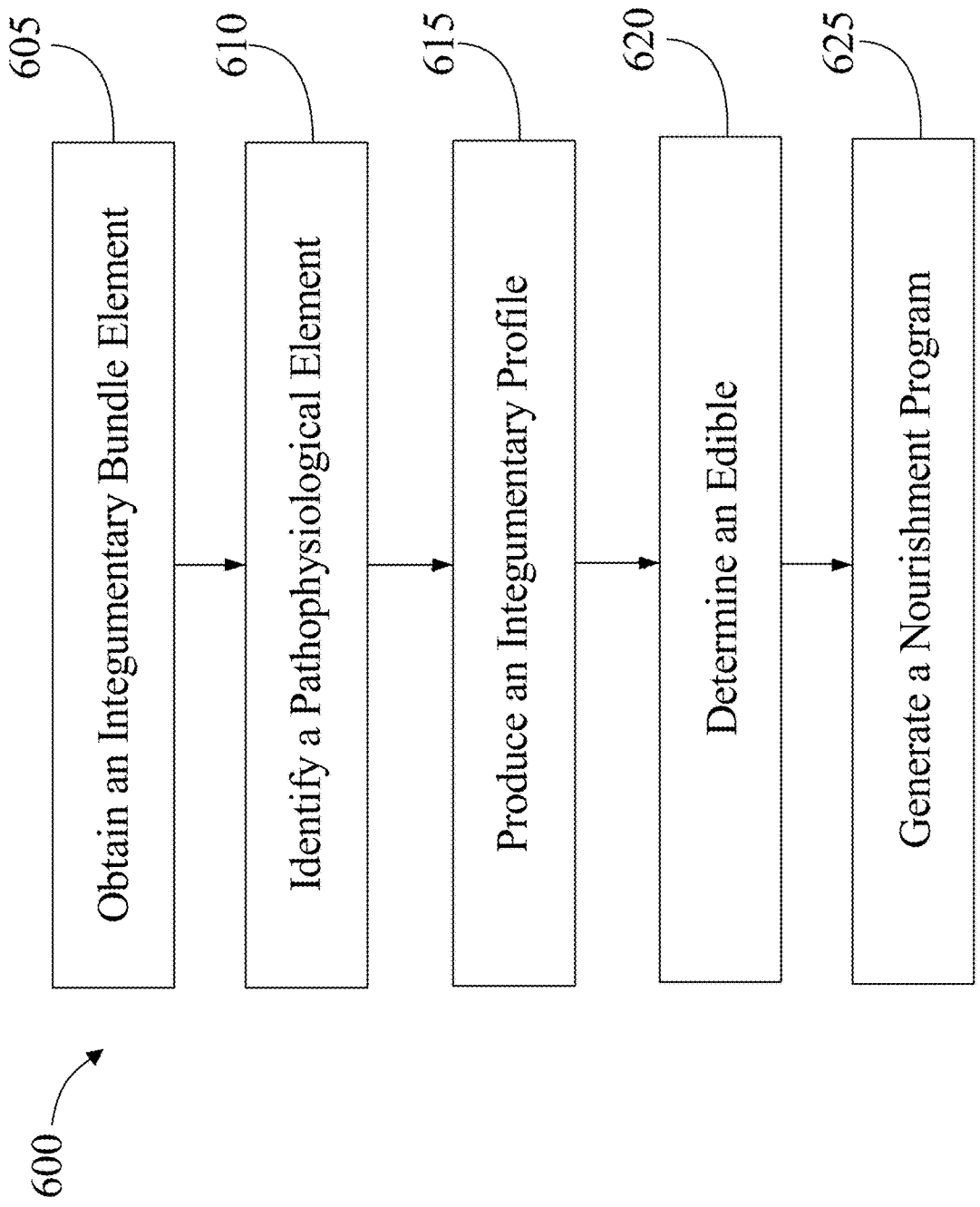
FIG. 6 is a process flow diagram illustrating an exemplary embodiment of a method of generating an integumentary dysfunction nourishment program.

Now referring to FIG. 6, an exemplary embodiment of a method 600 for generating an integumentary dysfunction nourishment program is illustrated. At step 605, a computing device 104 obtains an integumentary bundle element 108. computing device 104 includes any of the computing device 104 as described above, in reference to FIGS. 1-5. Integumentary bundle element 108 includes any of the integumentary bundle element 108 as described above, in reference to FIGS. 1-5.

Still referring to FIG. 6, at step 610, computing device 104 identifies a physiological group 112 as a function of integumentary bundle element 108. Physiological group 112 includes any of the physiological group 112 as a described above in reference to FIGS. 1-5

Still referring to FIG. 6, at step 615, computing device 104 produces an integumentary profile 116 as a function of physiological group 112. Integumentary profile 116 includes any of the integumentary profile 116 as described above, in reference to FIGS. 1-5. Integumentary profile 116 is produced by ascertaining an integumentary functional divergence 120 as a function of physiological group 112 and an integumentary recommendation 124. Integumentary functional divergence 120 includes any of the integumentary functional divergence 124 as described above, in reference to FIGS. 1-5. Integumentary recommendation 124 includes any of the integumentary recommendation 124 as described above, in reference to FIGS. 1-5. Computing device 104 produces integumentary profile 116 as a function of integumentary functional divergence 120 using an integumentary machine-learning model 128 Integumentary machine-learning model 128 includes any of the integumentary machine-learning model 128 as described above, in reference to FIGS. 1-5.

Still referring to FIG. 6, at step 620, computing device 104 determines an edible 132 as a function of integumentary profile 116. Edible 132 includes any of the edible 132 as described above, in reference to FIGS. 1-5. Edible 132 is determined by receiving a nourishment composition 136 from an edible directory 140. Nourishment composition 136 includes any of the nourishment composition 136 as described above, in reference to FIGS. 1-5. Edible directory 140 includes any of the edible directory 140 as described above, in reference to FIGS. 1-5. Edible 132 is determined by producing a nourishment demand 144 as a function of integumentary profile 116. Nourishment demand 144 includes any of the nourishment demand 144 as described above, in reference to FIGS. 1-5. Computing device 104 determines edible 132 as a function of nourishment composition 136 and nourishment demand 144 using an edible machine-learning model 148. Edible machine-learning model 148 includes any of the edible machine-learning model 148 as described above, in reference to FIGS. 1-5.

Still referring to FIG. 6, at step 625, computing device 104 generates a nourishment program 152 as a function of edible 132. Nourishment program 152 includes any of the nourishment program 152 as described above, in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
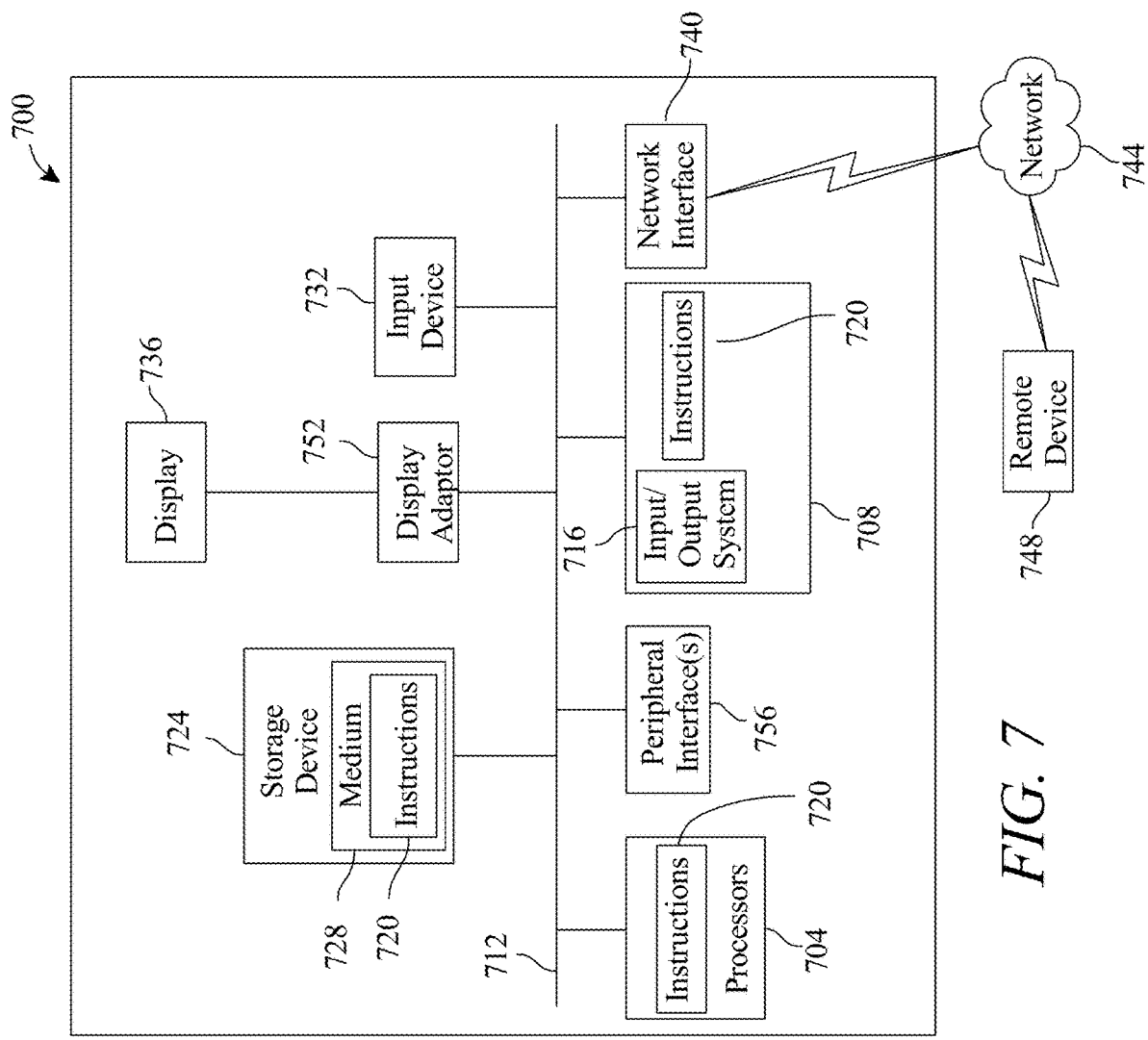
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating an integumentary dysfunction nourishment program, the system comprising:
   a computing device, the computing device configured to:
   obtain an integumentary bundle element, wherein the integumentary bundle element comprises at least a skin sample and;
   identify a physiological group as a function of the integumentary bundle element, wherein the physiological group comprises a group of integumentary bundle elements associated with regulation of body temperature;
   produce an integumentary profile as a function of the physiological group, wherein producing the integumentary profile further comprises:
   ascertaining an integumentary functional divergence as a function of the physiological group and an integumentary recommendation, wherein the integumentary recommendation comprises an epidermal layer thickness guideline, wherein the integumentary functional divergence comprises a transgression parameter wherein the transgression parameter identifies one or more integumentary functional divergences that exceed a variance limit;
classifying the integumentary functional divergence to at least one category of integumentary functional divergence based on a degree of divergence, wherein classifying the integumentary functional divergence comprises:
generating a classifier as a function of unfiltered training data using a classification algorithm;
filtering elements of the training data using the classifier to generate a plurality of training data sets each containing a plurality of data entries correlating integumentary functional divergences to categories of integumentary functional divergences based on degrees of divergence; and
classifying the integumentary functional divergence by selecting at least one filtered training data set of the plurality of training data sets; and
producing the integumentary profile as a function of the classified integumentary functional divergence and the selected at least one filtered training data set using an integumentary machine-learning model;
determine an edible as a function of the integumentary profile, wherein determining the edible further comprises:
receiving a nourishment composition from an edible directory;
producing a nourishment demand as a function of the integumentary profile; and
determining the edible as a function of the nourishment composition and the nourishment demand using an edible machine-learning model, wherein using the edible machine-learning model comprises:
training the edible machine-learning model using an edible training set, wherein the edible training set comprises at least a nourishment composition and at least a nourishment demand correlated to at least an edible from a previous iteration of the edible machine-learning model; and
generating the edible using the edible machine-learning model; and
generate a nourishment program as a function of the edible.

2. The system of claim 1, wherein the integumentary bundle element includes a biomarker.

3. The system of claim 1, wherein obtaining the integumentary bundle element includes receiving an input from a user and obtaining the integumentary bundle element as a function of the input.

4. The system of claim 1, wherein determining the edible further comprises:
generating a likelihood parameter, wherein the likelihood parameter relates a user taste profile to an edible profile; and
determining the edible as a function of the likelihood parameter.

5. The system of claim 4, wherein determining the edible profile further comprises receiving a flavor variable from a flavor directory and determining the edible profile as a function of the flavor variable.

6. The system of claim 1, wherein generating the nourishment program further comprises:
receiving an integumentary outcome; and
generating the nourishment program as a function of the integumentary outcome using a nourishment machine-learning model.

7. The system of claim 6, wherein the integumentary outcome includes a treatment outcome.

8. The system of claim 6, wherein the integumentary outcome includes a prevention outcome.

9. The system of claim 1, wherein the integumentary recommendation further comprises a skin hydration recommendation.

10. A method for generating an integumentary dysfunction nourishment program, the method comprising:
obtaining, by a computing device, an integumentary bundle element, wherein the integumentary bundle element comprises a skin sample;
identifying, by the computing device, a physiological group as a function of the integumentary bundle element, wherein the physiological group comprises a group of integumentary bundle elements associated with regulation of body temperature;
producing, by the computing device, an integumentary profile as a function of the physiological group, wherein producing the integumentary profile further comprises:
ascertaining an integumentary functional divergence as a function of the physiological group and an integumentary recommendation, wherein the integumentary recommendation comprises an epidermal layer thickness guideline, wherein the integumentary functional divergence comprises a transgression parameter wherein the transgression parameter identifies one or more integumentary functional divergences that exceed a variance limit;
classifying the integumentary functional divergence to at least one category of integumentary functional divergence based on a degree of divergence, wherein classifying the integumentary functional divergence comprises:
generating a classifier as a function of unfiltered training data using a classification algorithm;
filtering elements of the training data using the classifier to generate a plurality of training data sets each containing a plurality of data entries correlating integumentary functional divergences to categories of integumentary functional divergences based on degrees of divergence; and
classifying the integumentary functional divergence by selecting at least one filtered training data set of the plurality of training data sets; and
producing the integumentary profile as a function of the classified integumentary functional divergence and the selected at least one filtered training data set using an integumentary machine-learning model;
determining, by the computing device, an edible as a function of the integumentary profile, wherein determining the edible further comprises:
receiving a nourishment composition from an edible directory;
producing a nourishment demand as a function of the integumentary profile; and
determining the edible as a function of the nourishment composition and the nourishment demand using an edible machine-learning model, wherein using the edible machine-learning model comprises:

training the edible machine-learning model using an edible training set, wherein the edible training set comprises at least a nourishment composition and at least a nourishment demand correlated to at least an edible from a previous iteration of the edible machine-learning model; and generating the edible using the edible machine-learning model; and generating, by the computing device, a nourishment program as a function of the edible.

11. The method of claim 10, wherein the integumentary bundle element includes a biomarker.

12. The method of claim 10, wherein obtaining the integumentary bundle element includes receiving an input from a user and obtaining the integumentary bundle element as a function of the input.

13. The method of claim 10, wherein determining the edible further comprises:

generating a likelihood parameter, wherein the likelihood parameter relates a user taste profile to an edible profile; and determining the edible as a function of the likelihood parameter.

14. The method of claim 13, wherein determining the edible profile further comprises receiving a flavor variable from a flavor directory and determining the edible profile as a function of the flavor variable.

15. The method of claim 10, wherein generating the nourishment program further comprises:

receiving an integumentary outcome; and generating the nourishment program as a function of the integumentary outcome using a nourishment machine-learning model.

16. The method of claim 15, wherein the integumentary outcome includes a treatment outcome.

17. The method of claim 15, wherein the integumentary outcome includes a prevention outcome.

18. The method of claim 10, wherein the integumentary recommendation further comprises a skin hydration recommendation.

* * * * *